United States Patent [19]

Dozzi et al.

[11] Patent Number: 4,710,531
[45] Date of Patent: Dec. 1, 1987

[54] SELF-EXTINGUISHING POLYCARBONATE COMPOSITION

[75] Inventors: Giovanni Dozzi; Giorgio Della Fortuna, both of Milan; Salvatore Cucinella, S. Donato Milanese, all of Italy

[73] Assignee: Anic, S.p.A., Palermo, Italy

[21] Appl. No.: 524,788

[22] Filed: Aug. 19, 1983

[30] Foreign Application Priority Data

| Aug. 25, 1982 | [IT] | Italy | 22964 A/82 |
| Aug. 25, 1982 | [IT] | Italy | 22965 A/82 |
| Aug. 25, 1982 | [IT] | Italy | 22968 A/82 |
| Aug. 26, 1982 | [IT] | Italy | 22987 A/82 |
| May 3, 1983 | [IT] | Italy | 20903 A/83 |

[51] Int. Cl.$^4$ ............................................. C08K 5/17
[52] U.S. Cl. ................................ 524/239; 524/80; 524/94; 524/171; 524/260; 524/288; 524/373; 524/395; 524/396; 524/403; 524/405; 524/406; 524/408; 524/413; 524/431; 524/436
[58] Field of Search ........................ 524/239, 373, 371

[56] References Cited

U.S. PATENT DOCUMENTS

| 3,492,268 | 1/1970 | Baker | 524/605 |
| 3,836,490 | 9/1974 | Bockmann et al. | 524/611 |
| 4,263,201 | 4/1981 | Mark et al. | 524/371 |
| 4,632,953 | 12/1986 | Dozzi | 524/371 |

*Primary Examiner*—Veronica P. Hoke

[57] ABSTRACT

Self-extinguishing polycarbonates are disclosed, which consist of mixtures of polycarbonates with at least one salt of metals of the I and/or the II A and B Groups of the Periodic Table, and/or ammonium salts of organic carboxylic compounds having the general formula (I)

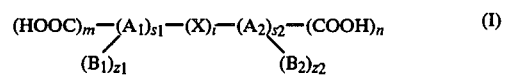

and, as an adjuvant, at least one compound which is a member selected from the group consisting of the following classes of compounds:

(i) a halogenated phenyl ether;
(ii) a phthalimide or naphthalimide;
(iii) an organic sulphone or a derivative thereof;
(iv) an inorganic compound selected from the group consisting of halides of alkali metals or of alkaline earth metals, oxides of metals of the Groups IB,VIB,-VIIB,IIIA,IVA and VIII of the Periodic Table, of the lanthanide group, carbon black and the residues of the pyrolysis of the organic acid salts of formula (I).

4 Claims, No Drawings

SELF-EXTINGUISHING POLYCARBONATE COMPOSITION

DESCRIPTION

Several procedures are known in the literature for imparting self-extinguishing properties to polycarbonates. However, many of such methods have proven poorly satisfactory in that they induce detrimental effects towards the other properties of the polymer concerned. For example, the self-extinguishing property of polycarbonates can be improved when using, as additives and at comparatively high levels, halogenated organic compounds, synergistically, or not, with antimony oxide (J. T. Howarth et al., Plastics World, 64–74, March 1973). It has been found, in any case, that the adoption of such-like additives involves an intolerable degradation of the polycarbonates during the processing operations (U.S. Pat. No. 3,334,154), which is then followed by a deterioration of the most important physical properties of the polymer concerned (U.S. Pat. No. 4,153,595). It had also been suggested to use tetrahalogenated derivatives of bisphenol A as comonomers in the copolymerization, with bisphenol A, to produce a polycarbonate which, as such, or admixed with a halogen-free polycarbonate, produces materials having an improved resistance to the flame. It has also been reported, in such a case, that, in order that a satisfactory resistance to the flame may be achieved, such polymeric materials should contain rather high amounts of halogen values (U.S. Pat. No. 4,046,836, U.S. Pat. No. 3,775,367 and U.S. Pat. No. 4,100,130) but this practice involves: (1) a pronounced worsening of the behavior in processing so that the mechanical properties never attain the level which is typical for the halogen-free polycarbonates; (2) evolution of halogen or a halide acid under the normal processing conditions, the result being corrosion of the machinery, and (3) evolution, under the combustion conditions, of large amounts of halogen-containing degradation products and, more particularly, of halide acids which are responsible for additional corrosion damages of the metallic structures.

More updated expedients are also known, according to which the self-extinguishing properties of polycarbonates are enhanced by the addition of small amounts of quite particular organic compounds, such as the salts of alkali metals, or alkaline earth metals, of aryl- or alkylsulphonic acids or their derivatives (for example, U.S. Pat. No. 3,940,366—U.S. Pat. No. 3,933,734—U.S. Pat. No. 4,104,253—U.S. Pat. No. 4,153,195 —U.S. Pat. No. 4,214,062). The assessment of the flame-retarding activity of such particular compounds has been the outcome of an intensive experimental work which was directed to a number of classes of organic compounds, whereby, inter alia, the inadequacy of the use of carboxylic acids as flame retarders had been detected, due to undesirable side-effects which had been induced, especially on the stability of the resin at the processing temperatures (V. Mark, Organic Coatings and Plastics Chemistry, vol. 43, Preprints of papers presented at the 2nd Chem. Congress of North American Continent, 1980, AUgust 24–29, S. Francisco, page 71).

In a previous application by the same Applicants hereof U.S. patent application Ser. No. 500.861 filed on June 3, 1983 now abandoned, refiled as Ser. No. 921,847 on Oct. 23, 1986 it had been reported that salts of the metals of the Groups IA, IB, IIA, and IIB of the Periodic Table, and ammonium salts of particular organic carboxylic compounds or mixtures thereof improve the self-extinguishing properties of polycarbonates without impairing the thermal stability under the conditions of processing and use, or the other particular properties of such polymers for technical use.

Such organic carboxylic compounds correspond to the general formula (I):

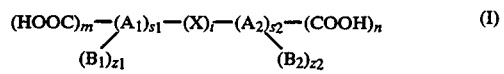

wherein $A_1$ and $A_2$, equal to, or different from, one another, are individually, a benzene radical or an aromatic polycondensed, heterocylic aromatic radical, a cycloaliphatic radical or an aliphatic radical; $B_1$ and $B_2$, equal to, or different from, one another are groups which substitute a part of the hydrogen atoms of $A_1$ or of $A_2$, respectively, and can be halogen atoms or groups such as: nitrile, nitro, sulpho, imido, ether, ester, ketone, halide acid, alkyl radical, cycloalkyl, aryl or heterocyclic radical; m and n, equal to, or different from, one another, may vary from zero to five, but at least one of these indices must be other than zero, a carboxyl group at least being present; $s_1$ and $s_2$, equal to, or different from, one another, may individually vary from zero to five, but at least one of these indices must be other than zero at least one $A_1$ or $A_2$ radical being present; $z_1$ and $z_2$, equal to, or different from, one another, may individually vary from zero to 6; i may take the value zero or one. When i=O, the group X is absent. When the organic carboxylic compound corresponding to the genreral formula (I) is salified by a metal of the Groups IA, IB, IIA, IIB of the Periodic Table, X is a biradical or a plural-radical which is a member selected from the group consisting of:

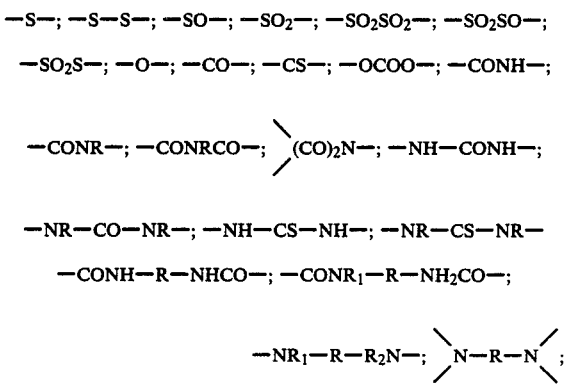

wherein R, $R_1$ and $R_2$, equal to, or different from each other, indicate a straight-line or branched aliphatic radical, a cycloaliphatic radical, an aryl radical also polycondensed, a heterocyclic radical or, also, a group of the type

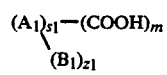

in which the symbols and the indexes have the meanings specified hereinabove.

When the organic carboxylic compound having the general formula (I) is salified by an ammonium group, X is a biradical or a plural-radical which is a member selected from the group consisting of

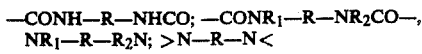

wherein R, $R_1$ and $R_2$ have the meanings which have been specified hereinabove.

The salts of the metals of the Groups IA, IB, IIA, IIB of the Periodic Table and the ammonium salts of the organic carboxylic compounds having the general formula (I), when employed individually or in admixture with each other, improve the self-extinguishing properties of polycarbonates, even if they are added in a minimum amount and up to the highest levels provided by the Standards UL-94 published by Underwriters' Laboratories in the Bulletin 94 which classifies the polymeric materials V-0, V-1, V-2 consistently with their behavior, as will be explained in more detail hereinafter.

They are employed in amounts which are equal to, or lower than 3 phr in total and, preferably, at levels which are equal to, or lower than 0.5 phr totally.

Now, we have found that the use of one or more adjuvants in union with one or more additives selected from among the salts of organic carboxylic compounds corresponding to the general formula (I) involves a further improvement of the self-extinguishing properties of the polycarbonate to which only the above specified additives have been added and/or permits that lower amounts of said additives may be employed.

Such adjuvants are members selected from the group consisting of:

(a) Halogenated organic ethers obtained by etherification of alcohols or phenols, mono- and polyfunctional, completely or partially halogenated and preferably from among the ethers or polyethers having the general formula (II)

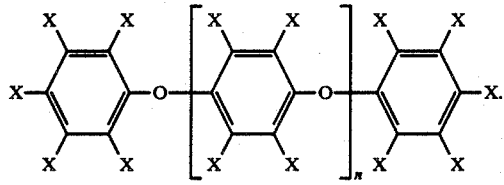

wherein n is comprised between 0 and 10,000 and X indicates, indifferently, atoms of hydrogen, fluorine, chlorine, bromine with the provision that at least one halogen atoms is present for at least one aromatic ring, and the general formula (III)

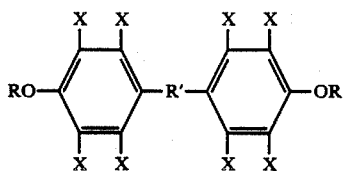

wherein X has the meaning specified above, R and R', equal to, or different from each other, indicate alkyl or cycloalkyl radicals, which can optionally be halogen-substituted.

(b) imides of organic aromatic, bifunctional or tetrafunctional, also halogen-substituted acids, employed individually or in admixture with each other. The imides are members selected from the group consisting of the compounds having the general formulae (IV), (V), (VI) and (VII).

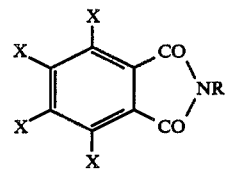

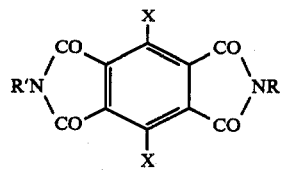

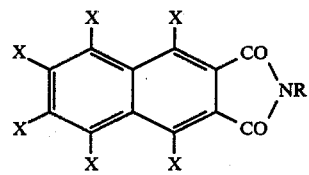

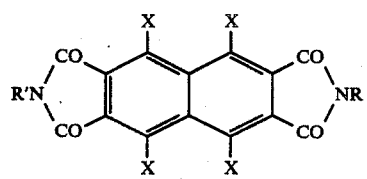

wherein R, R' are alkyls, aryls, cycloalkyls and can be equal to or different from each other and x can be indifferently hydrogen, fluorine, chlorine, bromine.

(c) organic aromatic sulfones and their derivatives which can be used individually or in admixture with each other. The organic aromatic sulfones can be monomeric or polymeric. In them, the $SO_2$ group is bound, in addition to being bound to an aromatic radical, also to other aromatic radicals, aliphatic radicals, cycloaliphatic and heterocyclic radicals which may contain, or not, different functional groups such as halogen atoms, ether groups, ester groups, ketone groups, nitriles, carbonate groups, sulphide, disulphide, amide, amine, and imide groups.

(d) inorganic compounds which are members selected from the group consisting of:
  (i) the halides of an alkali metal or an alkaline earth metal;
  (ii) the oxides of a metal of the Groups IB, VIB, VIIB, IIIA, IVA, VIII and of the lanthanide group
  (iii) carbon black
  (iv) the residue of the pyrolysis of one or more of the same additives composed of the salts of the metals of the I and/or II Group A and B of the Periodic Table of organic carboxylic compounds having the general formula (I) reported above.

Preferred embodiments of the salts of the organic carboxylic compounds corresponding to the general formula (I) are the following:
The potassium salt of the p.nitrobenzoic acid
The sodium salts of the p.iodobenzoic acid
The sodium salt of the pyridine-3-carboxylic acid
The potassium salt of the phenyl-1,3,5-tricarboxylic acid
The potassium salt of the phenyl-1,4-bicarboxylic acid The potassium salt of the biphenyl-2,2'-bicarboxylic acid
The sodium salt of the pyridine-3,5-bicarboxylic acid
The calcium salt of the pyridine-2,6-bicarboxylic acid
The potassium salt of the pyridine-2,6-bicarboxylic acid
The sodium salt of the pyridine-2,6-bicarboxylic acid
The sodium salt of the ethylenediaminotetraacetic acid
The potassium salt the ethylenediamino tetraacetic acid
The ammonium salt of the N,N'-(bis-paracarboxybenzoyl)-1,6-diaminohexanoic acid
The potassium salt of the pyridine-3,5-bicarboxylic acid
The sodium and ammonium salt of the ethylenediaminotetraacetic acid
The potassium salt of the trans-cyclohexane-1,4-bicarboxylic acid
The potassium salt of the biphenylsulfone-4,4'-bicarboxylic acid
The sodium salt of the N-cyclohexyl-4-carboxyphthalimide
The sodium salt of the biphenylsulfone-4,4'-bicarboxylic acid
The sodium salt of the 4-benzenesulfonebenzoic acid
The zinc salt of the biphenylsulfone-4,4'-bicarboxylic acid
The magnesium salts of the biphenylsulfone-4,4'-bicarboxylic acid
The lithium salt of the biphenylsulfone-4,4'-bicarboxylic acid
The potassium salt of the N-cyclohexyl-4-carboxyphthalimide The adjuvants are members selected from the group consisting of:
Iron oxide
octabromobiphenyloxide
residue of the pyrolysis of the potassium salt of the biphenylsulphone-4,4'-bicarboxylic acid
Cuprous oxide
Cobalt oxide
Silicon dioxide
Neodymium oxide
Manganese oxide
Potassium chloride
Boron trioxide
decabromobiphenyloxide
Potassium bromide
Brominated polyphenyleneoxide
2,2,2-trifluoro-ethyl ester of the biphenylsulfone-4,4'-bicarboxylic acid
Biphenyl-4,4'-bitolylsulfone
N-cyclohexyltetrachlorophthalimide
N,N'-bicyclohexylimide of the pyromellitic acid
Carbon black
Tetrabromobisphenol A-bis (2,3-dibromopropylether)
tetrabromobisphenol A-bis (2-hydroxyethyl ether)-bis acrylate
Chromic oxide
biphenyl-4,4'-biphenylsulfone
biphenylcarbonate-4,4'-biphenylsulfone The adjuvants can be used individually and/or in admixture with other adjuvants of the same class and/or belonging to different classes as defined above.

The salts of the metals of the Groups IA, IB, IIA, IIB of the Periodic Table and the ammonium salts of organic carboxylic compounds of general formula (I) are used individually or in admixture with each other in a quantity which is equal to or lower than totally, 3 phr and preferably in an amount equal to or lower than 0.5 phr. The adjuvants and their admixtures are used in an amount equal to or lower than 3 phr and preferably in an amount equal to or lower than 0.8 phr.

Such addition is profitable with any kind of aromatic polycarbonate having an average viscometric molecular weight between 10,000 and 100,000 and preferably between 20,000 and 50,000 and, more particularly, those polycarbonates which are prepared by reacting an aromatic diol, such as bisphenol A[2,2-bis(4-hydroxyphenyl)propane] with a precursor of the carbonate group.

The preparation of the polycarbonate with the interfacial polycondensation procedure is usually carried out in the presence of a molecular-weight-regulator, of an acid acceptor and a catalyst. The carbonate group precursor as generally used is carbonyl chloride, but other halides can also be employed, halogen formates or esters of the carbonic acid for processes carried out with no solvent being present. As the bisphenol, in addition to bisphenol-A, there can by used: Bis-(4-hydroxyphenyl)-alkanes such as bis-(4-hydroxyphenyl)-methane, 2,2-bis-(4-hydroxy-3-methylphenyl)-propane, hydroquinone, resorcinol, bis-(4-hydroxyphenyl)-p-diisopropylbenzene. Aromatic polyfunctional compounds having at least three functional groups can be used for producing branched polycarbonates.

It is quite possible to employ two or more bisphenols. The different products which are the subject matter of this invention can by used as flame-retarders not only in straight-line polycarbonates, but also in branched polycarbonates, their mixtures or polymeric alloys which contain also polycarbonates. In addition, the polycarbonate may contain also other additives, such as pigments, stabilizers against heat and oxygen, lubricants, dyestuffs, fillers, UV-absorbers and others.

All the operational details will become apparent from the scrutiny of the examples to follow which are intende for illustrating the invention only, without limiting the scope thereof.

EXAMPLES 1–109

100 parts of aromatic polycarbonate which has been prepared by reacting bisphenol-A with phosgene, are admixed with the additives and the adjuvants enumerated in Table 1.

The blend of additives and adjuvants, which had previously been homogenized by milling in a Retsch mill, and of polycarbonate, is introduced in an extruder heated to about 260° C. and the extrudate is then cooled and granulated.

The granules have been both compression molded (285° C., 40 kg/cm$^2$) and injection molded (at about 300° C.) to prepare test samples of different kinds. Sample A (127×12.7×3.2–1.6 mm), sample B (127×6.5×3.2 mm) and sample C (65×55×3.2 mm), the dimensions of the samples being approximate.

The samples A, five for each formulation reported in Table 1, are subjected to the flammability test for the classification of materials according to the Standards UL-94 by Underwriters' Laboratories. According to such test procedure, the materials are classified, respectively, as V-0, V-1 and V-2 on the basis of the results for the five samples and according to the following rules:
94 V-0: No sample must have a combustion time longer than 10 seconds after that the Bunsen flame has been withdrawn. The overall combustion time for the five samples (ten ignitions) must not exceed 50 seconds. No sample must allow burning particles to drop and inflame the surgical cotton pad placed vertically beneath the sample at the distance of 305 mm therefrom.

94 V-1 no sample must have a combustion time longer than 30 seconds after the withdrawal of the Bunsen flame. The total combustion time for the five samples (ten ignitions) must not exceed 250 seconds. No sample must allow burning particles to drop and inflame the surgical cotton pad placed vertically beneath the sample at a distance of 305 mm therefrom.

94 V-2 No sample must have a combustion time longer than 30 seconds after withdrawal of the Bunsen flame. The total combustion time for the five samples (ten ignitions) must not exceed 250 seconds; The samples are permitted to allow burning particles to drop and inflame the surgical cotton pad placed vertically beneath the sample at a distance of 305 mm therefrom.

Moreover, all the five samples must pass the UL-94 test, otherwise they are classified on the basis of the behavior of the worst sample. For example, if a sample has a behavior V-2 and the remaining four samples are V-0, all the five samples are classified V-2. If a sample continues to burn for more than 30 seconds after the withdrawal of the Bunsen flame, it cannot be classified on the basis of the UL-94 test but is indicated, in the present invention, as a polymer which burns. The samples B are subjected to the fire-resistance test according to ASTM D 2863-77 which establishes a correlation between the flammability of a polymeric material and the concentration of oxygen existing in the atmosphere in which the sample is being tested. This correlation is expressed in terms of LOI (Limiting Oxygen Index), that is to say, the minimum percentage of oxygen which is capable of supporting the combustion in a nitrogen-oxygen atmosphere impinging the sample concerned from bottom upwards. The samples C have been used for light-transmission tests using an XL211 Gardner machine. In order that the invention may better be illustrated, Table 1 reports the results of readings taken on the polycarbonate as such, adopted as a reference sample, and on the polycarbonate after the addition thereto of the salts of the organic carboxylic compound in union with the adjuvants according to the present invention.

Table 2 reports a technological evaluation of the polycarbonate as such, expressed as a reference sample, and of a few samples of polycarbonate to which the salts of the organic carboxylic compounds and the adjuvants enumerated in Table 1 had been added.

TABLE 1

| Example | Additive (phr) |
| --- | --- |
| R | Reference sample (polycarbonate with no additives) |
| 1 | Potassium salt of the p.nitrobenzoic acid (0.018) |
| 2 | — |
| 3 | Potassium salt of the p.nitrobenzoic acid (0.018) |
| 4 | Sodium salt of the p.iodobenzoic acid (0.06) |
| 5 | Sodium salt of the p.iodobenzoic acid (0.06) |
| 6 | — |
| 7 | Sodium salt of the p.iodobenzoic acid (0.06) |
| 8 | Sodium salt of the pyridine-3-carboxylic acid (0.06) |
| 9 | Sodium salt of the pyridine-3-carboxylic acid (0.06) |
| 10 | Potassium salt of the phenyl-1,3,5-tricarboxylic acid (0.05) |
| 11 | Potassium salt of the phenyl-1,3,5-tricarboxylic acid (0.05) |
| 12 | Potassium salt of the phenyl-1,4-bicarboxylic acid (0.07) |
| 13 | — |
| 14 | Potassium salt of the phenyl-1,4-bicarboxylic acid (0.07) |
| 15 | Potassium salt of the biphenyl-2,2'-bicarboxylic acid (0.035) |
| 16 | Potassium salt of the biphenyl-2,2'-bicarboxylic acid (0.035) |
| 17 | — |
| 18 | Potassium salt of the biphenyl-2,2'-bicarboxylic acid (0.035) |
| 19 | — |
| 20 | Potassium salt of the biphenyl-2,2'-bicarboxylic acid (0.035) |
| 21 | Sodium salt of the pyridine-3,5-bicarboxylic acid (0.04) |
| 22 | — |
| 23 | Sodium salt of the pyridine-3,5-bicarboxylic acid (0.04) |
| 24 | — |
| 25 | Sodium salt of the pyridine-3,5-bicarboxylic acid (0.04) |
| 26 | Sodium salt of the pyridine-3,5-bicarboxylic acid (0.04) |
| 27 | Sodium salt of the pyridine-3,5-bicarboxylic acid (0.07) |
| 28 | — |
| 29 | Sodium salt of the pyridine-3,5-bicarboxylic acid (0.04) |
| 30 | Sodium salt of the pyridine-3,5-bicarboxylic acid (0.03) |
| 31 | — |
| 32 | Calcium salt of the pyridine-2,6-bicarboxylic acid (0.2) |
| 33 | Calcium salt of the pyridine-2,6-bicarboxylic acid (0.1) |
| 34 | Potassium salt of the pyridine-2,6-bicarboxylic acid (0.02) |
| 35 | Potassium salt of the pyridine-2,6-bicarboxylic acid (0.07) |
| 36 | Sodium salt of the pyridine-2,6-bicarboxylic acid (0.02) |
| 37 | Sodium salt of the pyridine-2,6-bicarboxylic acid (0.1) |
| 38 | Sodium salt of the ethylenediaminotetraacetic acid (0.015) |
| 39 | Potassium salts of the ethylenediaminotetraacetic acid (0.012) |
| 40 | Potassium salt of the ethylenediaminotetraacetic acid (0.013) |
| 41 | Ammonium salt of the N,N'—(bis-p.carboxybenzoyl)-1,6-diaminohexanoic acid (0.1) |
| 42 | Sodium salt of the pyridine-2,6-bicarboxylic acid (0.02) |
| 43 | Potassium salt of the pyridine-3,5-bicarboxylic acid (0.03) |
| 44 | Sodium salt of the pyridine-2,6-bicarboxylic acid (0.02) |
| 45 | Potassium salt of the ethylenediaminotetraacetic acid (0.01) plus Potassium salt of the pyridine-2,6-bicarboxylic acid (0.003) |
| 46 | Salt of sodium and ammonium of the ethylenediaminotetraacetic ac. (0.03) |
| 47 | Potassium salt of the trans-cyclohexane-1,4-bicarboxylic acid (0.035) |
| 48 | Potassium salt of the biphenylsulfone-4,4'-bicarboxylic acid (0.1) |
| 49 | — |

TABLE 1-continued

| | |
|---|---|
| 50 | Potassium salt of the biphenylsulfone-4,4'-bicarboxylic acid (0.1) |
| 51 | — |
| 52 | Potassium salt of the biphenylsulfone-4,4'-bicarboxylic acid (0.1) |
| 53 | Sodium salt of the N—cyclohexyl-4-carboxyphthalimide (0.1) |
| 54 | Sodium salt of the N—cyclohexyl-4-carboxyphthalimide (0.1) |
| 55 | Potassium salt of the biphenylsulfone-4,4'-bicarboxylic acid (0.075) |
| 56 | — |
| 57 | Potassium salt of the biphenylsulfone-4,4'-bicarboxylic acid (0.075) |
| 58 | — |
| 59 | Potassium salt of the biphenylsulfone-4,4'-bicarboxylic acid (0.075) |
| 60 | Potassium salt of the biphenylsulfone-4,4'-bicarboxylic acid (0.1) |
| 61 | Potassium salt of the biphenylsulfone-4,4'-bicarboxylic acid (0.075) |
| 62 | Potassium salt of the biphenylsulfone-4,4'- bicarboxylic acid (0.075) |
| 63 | Potassium salt of the biphenylsulfone-4,4'-bicarboxylic acid (0.05) |
| 64 | — |
| 65 | Potassium salt of the biphenylsulfone-4,4'-bicarboxylic acid (0.05) |
| 66 | Potassium salt of the biphenylsulfone-4,4'-bicarboxylic acid (0.05) |
| 67 | Potassium salt of the biphenylsulfone-4,4'-bicarboxylic acid (0.05) |
| 68 | Potassium salt of the biphenylsulfone-4,4'-bicarboxylic acid (0.05) |
| 69 | Potassium salt of the biphenylsulfone-4,4'-bicarboxylic acid (0.05) |
| 70 | Potassium salt of the biphenylsulfone-4,4'-bicarboxylic acid (0.05) |
| 71 | Sodium salt of the biphenylsulfone-4,4'-bicarboxylic acid (0.1) |
| 72 | — |
| 73 | Sodium salt of the biphenylsulfone-4,4'-bicarboxylic acid (0.1) |
| 74 | Sodium salt of the biphenylsulfone-4,4'-bicarboxylic acid (0.035) |
| 75 | Sodium salt of the biphenylsulfone-4,4'-bicarboxylic acid (0.035) |
| 76 | Sodium salt of the 4-benzenesulfonebenzoic acid (0.05) |
| 77 | — |
| 78 | Sodium salt of the 4-benzenesulfonebenzoic acid (0.05) |
| 79 | Potassium salt of the biphenylsulfone-4,4'-bicarboxylic acid (0.075) |
| 80 | Potassium salt of the biphenylsulfone-4,4'-bicarboxylic acid (0.075) |
| 81 | — |
| 82 | Potassium salt of the biphenylsulfone-4,4'-bicarboxylic acid (0.035) |
| 83 | Potassium salt of the N—cyclohexyl-4-carboxyphthalimide (0.1) |
| 84 | Potassium salt of the N—cyclohexyl-4-carboxyphthalimide (0.1) |
| 85 | Potassium salt of the biphenylsulfone-4,4'-bicarboxylic acid (0.1) |
| 86 | — |
| 87 | Potassium salt of the biphenylsulfone-4,4'-bicarboxylic acid (0.1) |
| 88 | Potassium salt of the biphenylsulfone-4,4'-bicarboxylic acid (0.035) |
| 89 | — |
| 90 | Potassium salt of the biphenylsulfone-4,4'-bicarboxylic acid (0.035) |
| 91 | Potassium salt of the biphenylsulfone-4,4'-bicarboxylic acid (0.1) |
| 92 | — |
| 93 | Potassium salt of the biphenylsulphone-4,4'-bicarboxylic acid (0.1) |
| 94 | — |
| 95 | Potassium salt of the biphenylsulfone-4,4'-bicarboxylic acid (0.1) |
| 96 | Zinc salt of the biphenylsulfone-4,4'-bicarboxylic acid (0.05) |
| 97 | Zinc salt of the biphenylsulfone-4,4'-bicarboxylic acid (0.05) |
| 98 | Magnesium salt of the biphenylsulfone-4,4'-bicarboxylic acid (0.1) |
| 99 | Magnesium salt of the biphenylsulfone-4,4'-bicarboxylic acid (0.1) |
| 100 | Lithium salt of the biphenylsulfone-4,4'-bicarboxylic acid (0.1) |
| 101 | Lithium salt of the biphenylsulfone-4,4'-bicarboxylic acid (0.1) |
| 102 | Potassium salt of the biphenylsulfone-4,4'-bicarboxylic acid (0.05) |
| 103 | — |
| 104 | Potassium salt of the biphenylsulfone-4,4'-bicarboxylic acid (0.05) |
| 105 | Potassium salt of the biphenylsulfone-4,4'-bicarboxylic acid (0.035) |
| 106 | — |
| 107 | Potassium salt of the biphenylsulfone-4,4'-bicarboxylic acid (0.035) |
| 108 | Potassium salt of the N—cyclohexyl-4-carboxyphthalimide (0.1) |
| 109 | Potassium salt of the N—cyclohexyl-4-carboxyphthalimide (0.025) |

| Example | Adjuvant (phr) |
|---|---|
| 1 | None |
| 2 | Decabromobiphenyloxide (0.15) |
| 3 | Decabromobiphenyloxide (0.15) |
| 4 | None |
| 5 | Decabromobiphenyloxide (0.1) |
| 6 | Potassium bromide (0.1) |
| 7 | Potassium bromide (0.1) |
| 8 | None |
| 9 | Potassium bromide (0.1) |
| 10 | None |
| 11 | Decabromobiphenyloxide (0.1) |
| 12 | None |
| 13 | Bromided polyphenylene oxide (Br = 67.3%) (0.15) |
| 14 | Bromided polyphenylene oxide (Br = 67.3%) (0.1) |
| 15 | None |
| 16 | Bromided polyphenylene oxide (Br = 67.3%) (0.15) |
| 17 | 2,2,2-trifluoroethylester of the biphenylsulfone-4,4'-bicarboxylic acid (0.2) |
| 18 | 2,2,2-trifluoroethylester of the biphenylsulfone-4,4'-bicarboxylic acid (0.2) |
| 19 | Biphenyl-4,4'-ditolylsulfone (0.3) |
| 20 | Biphenyl-4,4'-ditolylsulfone (0.3) |

TABLE 1-continued

| | |
|---|---|
| 21 | Decabromobiphenyloxide (0.2) |
| 22 | N—cyclohexyltetrachlorophthalimide (0.25) |
| 23 | N—cyclohexyltetrachlorophthalimide (0.2) |
| 24 | N,N'—dicyclohexylimide of the pyromellitic acid (0.3) |
| 25 | None |
| 26 | N,N'—dicyclohexylimide of the pyromellitic acid (0.2) |
| 27 | Bromided polyphenyleneoxide (Br = 67.3%) (0.3) + carbon black (0.1) |
| 28 | Tetrabromobisphenol A bis(2,3-dibromopropylether) (0.15) |
| 29 | Tetrabromobisphenol A bis(2,3-dibromopropylether) (0.15) |
| 30 | Tetrabromobisphenol A bis(2,3-dibromopropylether) (0.1) + potassium bromide (0.1) |
| 31 | Tetrabromobisphenol A bis(2,3-dibromopropylether) (0.1) + potassium bromide (0.1) |
| 32 | None |
| 33 | Decabromobiphenyloxide (0.1) |
| 34 | Tetrabromobisphenol A bis(2-hydroxyethylether)-bis-acrylate (0.1) |
| 35 | Bromided polyphenyleneoxide (Br = 67.3%) (0.3) + iron oxide (0.1) + carbon black (0.3) |
| 36 | Decabromobiphenyloxide (0.1) |
| 37 | Bromided polyphenyleneoxide (Br = 67.3%) (0.3) + boric oxide (0.1) + carb. black (0.3) |
| 38 | Decabromobiphenyloxide (0.1) |
| 39 | Octabromobiphenyloxide (0.1) |
| 40 | Tetrabromobisphenol A bis(2-hydroxyethylether)-bis acrylate (0.1) |
| 41 | Decabromobiphenyloxide (0.2) |
| 42 | Decabromobiphenyloxide (0.05) + N,N'—bicyclohexylimide of the pyromellitic acid (0.05) |
| 43 | Bromided polyphenyleneoxide (Br = 67.3%) (0.07) + N,N'—bicyclohexylimide of the pyromellitic acid (0.05) |
| 44 | Biphenyl-4,4'-ditolylsulfone (0.1) + N,N'—bicyclohexylimide of the pyromellitic acid (0.05) |
| 45 | Decabromobiphenyloxide (0.07) |
| 46 | Decabromobiphenyloxide (0.07) + biphenyl-4,4'-ditolylsulfone (0.05) |
| 47 | Potassium bromide (0.15) |
| 48 | None |
| 49 | Residue of the pyrolysis of the potassium salt of the biphenylsulfone-4,4'-bicarboxylic acid (0.15) |
| 50 | Residue of the pyrolysis of the potassium salt of the biphenylsulfone-4,4'-bicarboxylic acid (0.1) |
| 51 | Carbon black (0.1) |
| 52 | Carbon black (0.1) |
| 53 | None |
| 54 | Carbon black (0.1) |
| 55 | None |
| 56 | Cuprous oxide (0.15) |
| 57 | Cuprous oxide (0.15) |
| 58 | Cobalt oxide (0.15) |
| 59 | Cobalt oxide (0.15) |
| 60 | Silicon dioxide (0.2) |
| 61 | Neodymium oxide (0.15) |
| 62 | Manganese oxide (0.15) |
| 63 | None |
| 64 | Potassium bromide (0.1) |
| 65 | Potassium bromide (0.1) |
| 66 | Potassium chloride (0.15) |
| 67 | Cobalt oxide (0.07) + Potassium bromide (0.05) |
| 68 | Residue of the pyrolysis of the potassium salt of the biphenylsulfone-4,4'-bicarboxylic acid (0.05) + carbon black (0.07) |
| 69 | Boric oxide (0.05) + Potassium bromide (0.07) |
| 70 | Chromic oxide (0.05) + Carbon black (0.05) |
| 71 | None |
| 72 | Biphenyl-4,4'-biphenylsulfone (0.2) |
| 73 | Biphenyl-4,4'-biphenylsulfone (0.2) |
| 74 | Biphenyl-4,4'-ditolylsulfone (0.1) |
| 75 | Biphenyl-4,4'-ditolylsulfone (0.1) + Potassium bromide (0.1) |
| 76 | None |
| 77 | Biphenyl-4,4'-ditolylsulfone (0.3) |
| 78 | Biphenyl-4,4'-ditolylsulfone (0.3) |
| 79 | None |
| 80 | Biphenylcarbonate-4,4'-biphenylsulfone (0.1) + Potassium bromide (0.1) |
| 81 | Biphenyl-4,4'-ditolylsulfone (0.1) + Potassium chloride (0.15) |
| 82 | Biphenyl-4,4'-ditolylsulfone (0.1) + Potassium chloride (0.15) |
| 83 | None |
| 84 | Biphenyl-4,4'-biphenylsulfone (0.2) |
| 85 | None |
| 86 | N,N'—bicyclohexylimide of the pyromellitic acid (0.3) |
| 87 | N,N'—bicyclohexylimide of the pyromellitic acid (0.3) |
| 88 | N,N'—bicyclohexylimide of the pyromellitic acid (0.1) |
| 89 | N,N'—bicyclohexylimide of the pyromellitic acid (0.2) + Potassium bromide (0.2) |
| 90 | N,N'—bicyclohexylimide of the pyromellitic acid (0.1) + Potassium bromide (0.05) |
| 91 | None |
| 92 | Bromided polyphenyleneoxide (Br = 67.3%) (0.15) |
| 93 | Bromided polyphenyleneoxide (Br = 67.3%) (0.1) |
| 94 | Decabromobiphenyloxide (0.1) |
| 95 | Decabromobiphenyloxide (0.1) |
| 96 | None |
| 97 | Bromided polyphenyleneoxide (Br = 67.3%) (0.15) |

TABLE 1-continued

| | |
|---|---|
| 98 | None |
| 99 | Bromided polyphenyleneoxide (Br = 67.3%) (0.1) |
| 100 | None |
| 101 | Decabromobiphenyloxide (0.075) |
| 102 | None |
| 103 | Tetrabromobisphenol A bis(2,3-dibromopropylether) (0.1) |
| 104 | Tetrabromobisphenol A bis(2,3-dibromopropylether) (0.1) |
| 105 | None |
| 106 | Tetrabromobisphenol A bis(2,3-dibromopropylether) (0.1) + Potassium bromide (0.1) |
| 107 | Tetrabromobisphenol A bis(2,3-dibromopropylether) (0.1) + Potassium bromide (0.1) |
| 108 | None |
| 109 | Decabromobiphenyloxide (0.2) |

| Example | Total comb. time of 5 samples (10 ignit.) sec (A) | Max. comb. time per sample (2 ignit.) sec (B) | Number of inflamed drops for 5 samples, which inflame cotton pad (C) | UL-94 Classific. (D) | LOI % (E) | MFI 300° C.-1.2 kg g/10 mins. (F) | Transmitted Light:, % (G) |
|---|---|---|---|---|---|---|---|
| R | 250 | 74 | 7 | Burns | 26 | 5,8 | 88,9 |
| 1 | 77 | 19 | 2 | V-2 | 32 | 7,1 | 88,5 |
| 2 | 70 | 16 | 4 | V-2 | 30 | 6,1 | 88,6 |
| 3 | 42 | 10 | 0 | V-0 | 34 | 7,3 | 88,0 |
| 4 | 53 | 17 | 0 | V-1 | 35 | 7,8 | 87,4 |
| 5 | 33 | 8 | 0 | V-0 | 36 | 7,9 | 87,0 |
| 6 | 92 | 27 | 4 | V-2 | 31 | 5,9 | 86,3 |
| 7 | 29 | 7 | 0 | V-0 | 36 | 8,0 | 86,0 |
| 8 | 48 | 14 | 0 | V-1 | 35 | 7,7 | 88,0 |
| 9 | 31 | 9 | 0 | V-0 | 36 | 7,9 | 86,3 |
| 10 | 56 | 16 | 0 | V-1 | 34 | 8,0 | 87,1 |
| 11 | 33 | 9 | 0 | V-0 | 36 | 8,2 | 87,0 |
| 12 | 45 | 12 | 0 | V-1 | 36 | 6,8 | 87,4 |
| 13 | 79 | 19 | 4 | V-2 | 29 | 6,0 | 88,1 |
| 14 | 36 | 9 | 0 | V-0 | 37 | 7,0 | 87,0 |
| 15 | 81 | 18 | 1 | V-2 | 33 | 6,8 | 88,4 |
| 16 | 39 | 10 | 0 | V-0 | 36 | 7,1 | 87,6 |
| 17 | 87 | 23 | 3 | V-2 | 29 | 6,1 | 88,7 |
| 18 | 42 | 10 | 0 | V-0 | 35 | 7,0 | 88,2 |
| 19 | 70 | 19 | 2 | V-2 | 33 | 6,0 | 87,8 |
| 20 | 31 | 9 | 0 | V-0 | 36 | 7,3 | 87,1 |
| 21 | 22 | 6 | 0 | V-0 | 38 | 6,1 | 87,5 |
| 22 | 83 | 21 | 4 | V-2 | 29 | 5,9 | 88,8 |
| 23 | 23 | 6 | 0 | V-0 | 37 | 6,2 | 87,6 |
| 24 | 90 | 23 | 5 | V-2 | 30 | 6,0 | 88,9 |
| 25 | 52 | 13 | 0 | V-1 | 34 | 5,9 | 87,6 |
| 26 | 31 | 9 | 0 | V-0 | 35 | 6,1 | 87,3 |
| 27 | 20 | 5 | 0 | V-0 | 42 | 6,8 | — |
| 28 | 85 | 24 | 5 | V-2 | 30 | 5,9 | 88,4 |
| 29 | 33 | 8 | 0 | V-0 | 37 | 6,1 | 87,6 |
| 30 | 29 | 8 | 0 | V-0 | 37 | 6,0 | 86,5 |
| 31 | 79 | 19 | 1 | V-2 | 33 | 5,9 | 86,6 |
| 32 | 112 | 26 | 3 | V-2 | 33 | 6,2 | 85,0 |
| 33 | 91 | 24 | 0 | V-1 | 34 | 6,2 | 86,2 |
| 34 | 30 | 9 | 0 | V-0 | 34 | 6,4 | 88,3 |
| 35 | 19 | 4 | 0 | V-0 | 39 | 6,6 | — |
| 36 | 23 | 8 | 0 | V-0 | 35 | 6,4 | 88,3 |
| 37 | 12 | 4 | 0 | V-0 | 42 | 6,6 | — |
| 38 | 26 | 8 | 0 | V-0 | 38 | 6,4 | 88,8 |
| 39 | 34 | 9 | 0 | V-0 | 34 | 6,1 | 88,9 |
| 40 | 27 | 8 | 0 | V-0 | 37 | 6,1 | 88,7 |
| 41 | 73 | 16 | 0 | V-1 | 33 | 5,9 | 88,3 |
| 42 | 22 | 7 | 0 | V-0 | 36 | 6,0 | 88,1 |
| 43 | 30 | 8 | 0 | V-0 | 37 | 6,0 | 87,6 |
| 44 | 21 | 8 | 0 | V-0 | 36 | 5,9 | 88,6 |
| 45 | 15 | 4 | 0 | V-0 | 37 | 6,1 | 88,4 |
| 46 | 29 | 7 | 0 | V-0 | 36 | 6,3 | 88,0 |
| 47 | 39 | 9 | 0 | V-0 | 36 | 6,0 | 86,0 |
| 48 | 38 | 9 | 3 | V-2 | 37 | 8,8 | |
| 49 | 67 | 15 | 2 | V-2 | 33 | 8,3 | |
| 50 | 46 | 10 | 0 | V-0 | 36 | 8,7 | |
| 51 | 118 | 28 | 5 | V-2 | 29 | 8,3 | |
| 52 | 37 | 10 | 0 | V-0 | 36 | 8,8 | |
| 53 | 46 | 15 | 0 | V-1 | 37 | 8,9 | |
| 54 | 33 | 9 | 0 | V-0 | 38 | 9,0 | |
| 55 | 34 | 9 | 4 | V-2 | 36 | 8,5 | |
| 56 | 101 | 27 | 3 | V-2 | 30 | 8,4 | |
| 57 | 35 | 9 | 0 | V-0 | 37 | 8,7 | |
| 58 | 121 | 29 | 3 | V-2 | 29 | 8,5 | |
| 59 | 36 | 9 | 0 | V-0 | 34 | 8,9 | |
| 60 | 47 | 10 | 0 | V-0 | 37 | 8,8 | |
| 61 | 36 | 10 | 0 | V-0 | 35 | 8,9 | |
| 62 | 48 | 10 | 0 | V-0 | 36 | 9,0 | |
| 63 | 35 | 10 | 4 | V-2 | 36 | 8,2 | |

TABLE 1-continued

| | | | | | | | | |
|---|---|---|---|---|---|---|---|---|
| 64 | 96 | 30 | 4 | V-2 | 31 | 8,1 | |
| 65 | 32 | 7 | 0 | V-0 | 38 | 8,2 | |
| 66 | 34 | 7 | 0 | V-0 | 38 | 8,2 | |
| 67 | 35 | 8 | 0 | V-0 | 35 | 8,3 | |
| 68 | 43 | 10 | 0 | V-0 | 36 | 8,3 | |
| 69 | 39 | 10 | 0 | V-0 | 34 | 8,4 | |
| 70 | 34 | 9 | 0 | V-0 | 38 | 8,7 | |
| 71 | 27 | 9 | 3 | V-2 | 37 | 8,7 | 84,2 |
| 72 | 79 | 24 | 2 | V-2 | 32 | 8,6 | 84,0 |
| 73 | 33 | 10 | 0 | V-0 | 37 | 8,9 | 83,4 |
| 74 | 48 | 15 | 0 | V-1 | 35 | 8,3 | 85,1 |
| 75 | 34 | 9 | 0 | V-0 | 37 | 8,4 | 84,6 |
| 76 | 65 | 16 | 2 | V-2 | 35 | 9,4 | 84,0 |
| 77 | 73 | 21 | 2 | V-2 | 33 | 8,6 | 84,1 |
| 78 | 41 | 10 | 0 | V-0 | 36 | 9,3 | 83,3 |
| 79 | 34 | 9 | 4 | V-2 | 36 | 8,5 | 85,0 |
| 80 | 32 | 9 | 0 | V-0 | 36 | 8,8 | 84,8 |
| 81 | 60 | 14 | 1 | V-2 | 31 | 8,3 | 79,1 |
| 82 | 29 | 8 | 0 | V-0 | 35 | 8,3 | 78,2 |
| 83 | 43 | 14 | 0 | V-1 | 38 | 8,9 | 85,8 |
| 84 | 25 | 7 | 0 | V-0 | 39 | 9,1 | 84,0 |
| 85 | 38 | 9 | 3 | V-2 | 37 | 8,8 | 84,6 |
| 86 | 92 | 25 | 5 | V-2 | 31 | 8,3 | 86,0 |
| 87 | 36 | 10 | 0 | V-0 | 38 | 8,9 | 84,2 |
| 88 | 47 | 14 | 0 | V-1 | 34 | 8,6 | 85,5 |
| 89 | 40 | 13 | 1 | V-2 | 33 | 9,0 | 83,2 |
| 90 | 31 | 9 | 0 | V-0 | 35 | 8,7 | 84,7 |
| 91 | 38 | 9 | 3 | V-2 | 37 | 8,8 | 84,6 |
| 92 | 81 | 22 | 4 | V-2 | 29 | 8,5 | 85,4 |
| 93 | 40 | 10 | 0 | V-0 | 39 | 8,8 | 84,2 |
| 94 | 72 | 19 | 5 | V-2 | 30 | 8,5 | 86,0 |
| 95 | 21 | 6 | 0 | V-0 | 40 | 9,0 | 84,0 |
| 96 | 87 | 25 | 4 | V-2 | 31 | 8,3 | 79,3 |
| 97 | 30 | 8 | 0 | V-0 | 37 | 8,7 | 77,5 |
| 98 | 55 | 20 | 4 | V-2 | 33 | 8,2 | 80,0 |
| 99 | 46 | 10 | 0 | V-0 | 36 | 8,5 | 79,2 |
| 100 | 39 | 15 | 3 | V-2 | 34 | 8,2 | 80,4 |
| 101 | 41 | 10 | 0 | V-0 | 36 | 8,4 | 81,0 |
| 102 | 35 | 10 | 4 | V-2 | 36 | 8,2 | 85,0 |
| 103 | 87 | 27 | 5 | V-2 | 30 | 8,4 | 85,6 |
| 104 | 43 | 10 | 0 | V-0 | 35 | 8,6 | 85,0 |
| 105 | 46 | 12 | 4 | V-2 | 33 | 8,2 | 85,5 |
| 106 | 74 | 17 | 1 | V-2 | 33 | 8,4 | 85,6 |
| 107 | 31 | 7 | 0 | V-0 | 38 | 8,9 | 85,1 |
| 108 | 43 | 14 | 0 | V-1 | 38 | 8,9 | 85,8 |
| 109 | 29 | 8 | 0 | V-0 | 37 | 8,4 | 85,5 |

TABLE 2

| | (°) | | | | | | | | | |
|---|---|---|---|---|---|---|---|---|---|---|
| Example No. | Thermal Stability at 300° C. Δ % MFI (300° C.; 1.2 kg) after 60 mins. | Izod resil. ductile/ brittle °C. | Vicat 1 kg °C. | HDT °C. | Bending stress | | Yield point MPa | Tensile str. MPa | Elongation at break, % |
| | | | | | Elast. Modulus MPa | Load, max. MPa | | | |
| Ref. sample | 24,3 | −30 | 158 | 130 | 2264 | 94 | 60 | 66 | 125 |
| 21 | 13,3 | −20 | 158 | 130 | 2345 | 96 | 60 | 66 | 124 |
| 27 | 13,6 | −25 | 158 | 130 | 2342 | 95 | 60 | 69 | 132 |
| 36 | 16,1 | −25 | 160 | 130 | 2286 | 96 | 60 | 69 | 130 |
| 37 | — | −25 | 160 | 130 | 2349 | 97 | 60 | 66 | — |
| 38 | 24,0 | −30 | 158 | 130 | 2300 | 96 | 61 | 66 | 129 |

INSERT EQUATION.....

What is claimed is:

1. A self-extinguishing polycarbonate composition consisting of an aromatic polycarbonate having an average viscometric molecular weight between 10,000 and 100,000 mixed with
   (A) at least one metal salt and/or ammonium salt of ethylenediaminotetraacetic acid, said metal being selected from the metals of Groups IA, IB, IIA or IIB of the Periodic Table; and
   (B) a halogenated organic ether having the general formula (II)

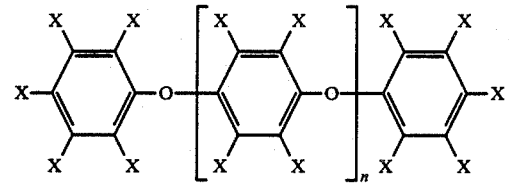

wherein n is an integer from 0 to 10,000 and X can be, independently, hydrogen, fluorine, chlorine or bromine, wherein at least one X per aromatic ring is halogen.

2. The composition of claim 1, wherein said halogenated organic ether is a halogenated biphenyl oxide.

3. A composition as defined in claim 2, wherein said halogenated organic ether is decabromobiphenyloxide or octabromobiphenyloxide.

4. A composition as defined in claim 1, wherein said salt component (A) is selected from the sodium, potassium or ammonium salts of ethylenediaminotetraacetic acid, or mixtures thereof; and said halogenated organic ether (B) is selected from octabromobiphenyloxide, decabromobiphenyloxide, brominated polyphenyleneoxide, or mixtures thereof.

* * * * *